US006973310B2

(12) United States Patent
Neufeld (10) Patent No.: US 6,973,310 B2
(45) Date of Patent: Dec. 6, 2005

(54) FAST REACQUISITION AFTER LONG SLEEP

(75) Inventor: Arthur J. Neufeld, Longmont, CO (US)

(73) Assignee: Qualcomm Inc., San Diego, CA (US)

(*) Notice: Subject to any disclaimer, the term of this patent is extended or adjusted under 35 U.S.C. 154(b) by 393 days.

(21) Appl. No.: 10/292,191

(22) Filed: Nov. 11, 2002

(65) Prior Publication Data

US 2004/0002333 A1    Jan. 1, 2004

Related U.S. Application Data

(60) Provisional application No. 60/391,939, filed on Jun. 26, 2002.

(51) Int. Cl.[7] .............................................. H04Q 7/20
(52) U.S. Cl. ...................................... 455/436; 455/451
(58) Field of Search ................................. 455/436, 437, 455/438, 439, 440, 441, 442, 443, 444

(56) References Cited

U.S. PATENT DOCUMENTS

| 5,392,287 | A | * | 2/1995 | Tiedemann et al. | 370/311 |
| 5,805,648 | A | * | 9/1998 | Sutton | 375/367 |
| 5,854,785 | A | * | 12/1998 | Willey | 370/332 |
| 5,987,012 | A |   | 11/1999 | Bruckert et al. | 370/331 |
| 6,069,880 | A | * | 5/2000 | Owen et al. | 370/311 |
| 6,356,538 | B1 |  | 3/2002 | Li | 370/311 |
| 6,782,250 | B2 | * | 8/2004 | Rainish et al. | 455/343.2 |

FOREIGN PATENT DOCUMENTS

| WO | 0030394 | 5/2000 | ............ H04Q 7/38 |
| WO | 0176313 A1 | 10/2001 | ............ H04Q 7/38 |

OTHER PUBLICATIONS

Sarkar S. et al: "CDMA2000: Battery Life Improvement Techniques" IEEE 2000, vol. 2, Sep. 18. 2000, pp. 954-958, XP010520776.

Anderson et al: High-Efficiency High-Level Modulator for Use in Dynamic Envelope Tracking CDMA RF Power Amplifiers, IEEE 2001, pp. 1509-1512.

Staudinger et al: "High Efficiency CDMA RF Power Amplifier Using Dynamic Envelope Tracking Technique", IEEE 2000, pp. 873-876.

Briffa et al: "Dynamically Biased Cartesian Feedback Linearization", IEEE 1993, pp. 672-675.

* cited by examiner

*Primary Examiner*—Nguyen T. Vo
*Assistant Examiner*—Julie E Stein
(74) *Attorney, Agent, or Firm*—Philip R. Wadsworth; Charles D. Brown; Kenyon Jenckes (57) ABSTRACT

The mobile station is in the sleep mode until just prior to a designated slot. Upon wakeup, the mobile station ensures a link is maintained with the network by measuring the strength of several pilots. If a neighbor pilot is stronger than the current pilot, a handoff is performed. After handoff, the Control Channel Capsule (CCC) may be demodulated by the mobile station to obtain new overhead information, such as neighbor pilots. If no handoff is performed, the reacquisition slew for the current pilot is measured and fed back to the sleep controller to determine the next wake-up time. The mobile station then returns to sleep mode.

24 Claims, 6 Drawing Sheets

FAST REACQUISITION AFTER LONG SLEEP

CROSS-REFERENCE TO RELATED APPLICATIONS

This application claims benefit of U.S. Provisional Application No. 60/391,939, filed Jun. 26, 2002, the content of which is herein incorporated by reference in its entirety.

TECHNICAL FIELD

The present application relates to wireless communication systems, and more particularly to improving standby time of a mobile station utilizing sleep until handoff.

BACKGROUND

Wireless communication systems may operate using fixed infrastructure equipment or in ad-hoc configurations. In fixed infrastructure models, wireless communication systems typically comprise a plurality of base stations and mobile stations that communicate using an over-the-air communication protocol using physical layer technologies such as Code Division Multiple Access (CDMA) technology.

Wireless communications systems such as CDMA typically operate using a variety of channels. In CDMA, for example, channelization is accomplished using orthogonal or quasi-orthogonal codes. Different channels generally have different purposes. Common channels are used to communicate to a plurality of mobile stations or base stations at the same time while dedicated channels are typically used for communication to and from one mobile station.

In a CDMA-equipped system, a mobile station communicates with any one or more of a plurality of base stations dispersed in a geographic region. Each base station continuously transmits a pilot signal having the same spreading code but with a different code phase offset. Phase offset allows the pilot signals to be distinguished from one another, which in turn allows the base stations to be distinguished. Furthermore, a mobile station can measure the signal-to-noise of each pilot signal, which indicates the pilot's relative signal strength.

In wireless systems, the ability to minimize power consumption in a mobile station is important. Slotted paging systems provide the ability for a mobile station to conserve power by not monitoring paging messages for a duration of time. Thus, the mobile station can sleep when paging messages are not being demodulated. Paging messages contain information about a base station including neighbor lists. Power consumption in the mobile station can further be minimized in a slotted paging system if the signal is acquired prior to the paging slot.

A hybrid Access Terminal may monitor multiple systems, such as one system for voice communications and a second-system for data communications. In particular, hybrid systems using slotted paging can benefit because of increased sleep time resulting in less power consumption in the mobile station.

What is needed is a system that minimizes the amount of time monitoring on the second system while still providing "instant on" access when desired.

SUMMARY

The mobile station is in the sleep mode until just prior to a designated slot. Upon wakeup, the mobile station ensures a link is maintained with the network by measuring the strength of several pilots. If a neighbor pilot is stronger than the current pilot, a handoff is performed. After handoff, the Control Channel Capsule (CCC) may be demodulated by the mobile station to obtain new overhead information, such as neighbor pilots. If no handoff is performed, the reacquisition slew for the current pilot is measured and fed back to the sleep controller to determine the next wake-up time. If the mobile station does not receive a page, the mobile station returns to sleep mode.

Features of the disclosed subject matter will become apparent upon reading the following detailed description and upon reference to the accompanying drawings.

DETAILED DESCRIPTION

Figure 1:
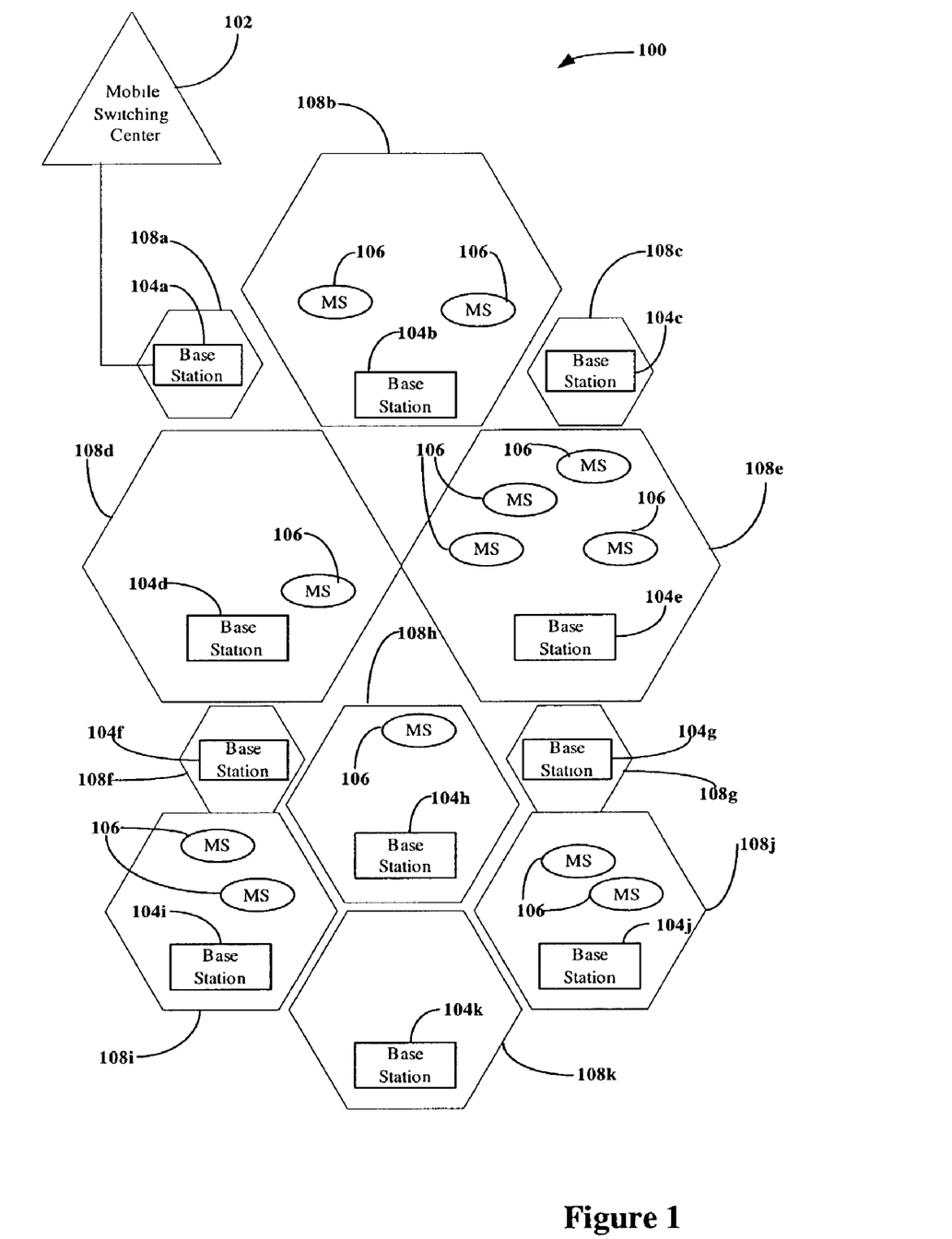
FIG. 1 illustrates components of an exemplary wireless communication system.

FIG. 1 illustrates components of an exemplary wireless communication system. A mobile switching center 102 communicates with base stations 104*a*–104*k* (only one connection shown). The base stations 104*a*–104*k* (generally 104) broadcasts data to and receives data from mobile stations 106 within cells 108*a*–108*k* (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108*a*, 108*c*, 108*d*, and 108*e* adjacent to the cell 108*b* permit mobile stations 106 to cross cell boundaries without interrupting communications. This is so because base stations 104*a*, 104*c*, 104*d*, and 104*e* in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (i.e., frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores, and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, and then exits the idle state to receive another transmission of paging message data.

Figure 2:
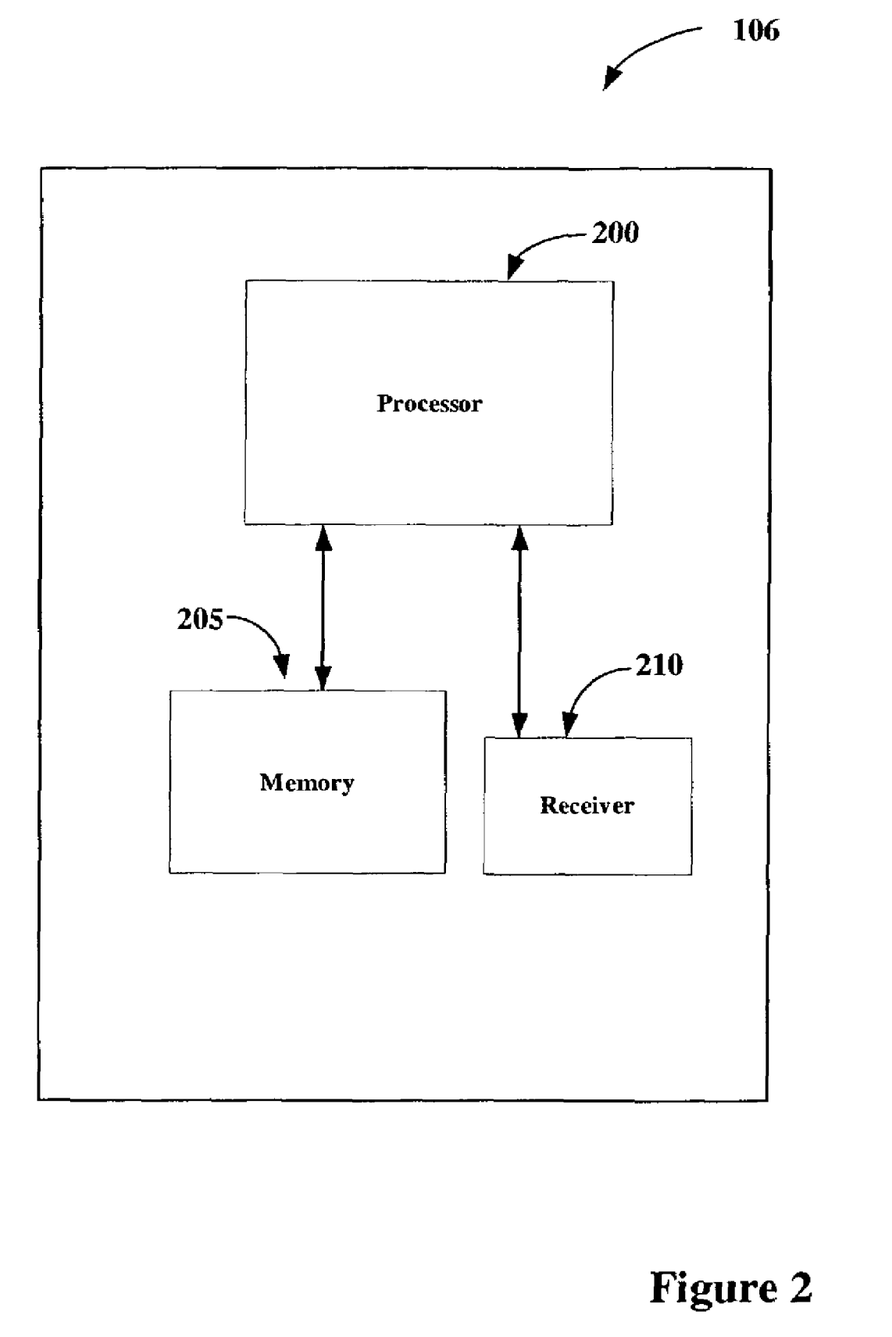
FIG. 2 illustrates components of a mobile station according to one embodiment of the disclosed subject matter.

FIG. 2 illustrates a mobile station 106 according to one embodiment of the disclosed subject matter. The mobile station 106 includes a processor 200, memory 205, and a receiver 210. The receiver 210 may be a transceiver capable of receiving and transmitting a plurality of signals over the wireless communication system. The processor 200 is configured to activate and deactivate the receiver at designated times, as well as process the signals received by the receiver 210. The memory 205 stores information, and can either receive information from, or supply information to the processor 200.

Figure 3:
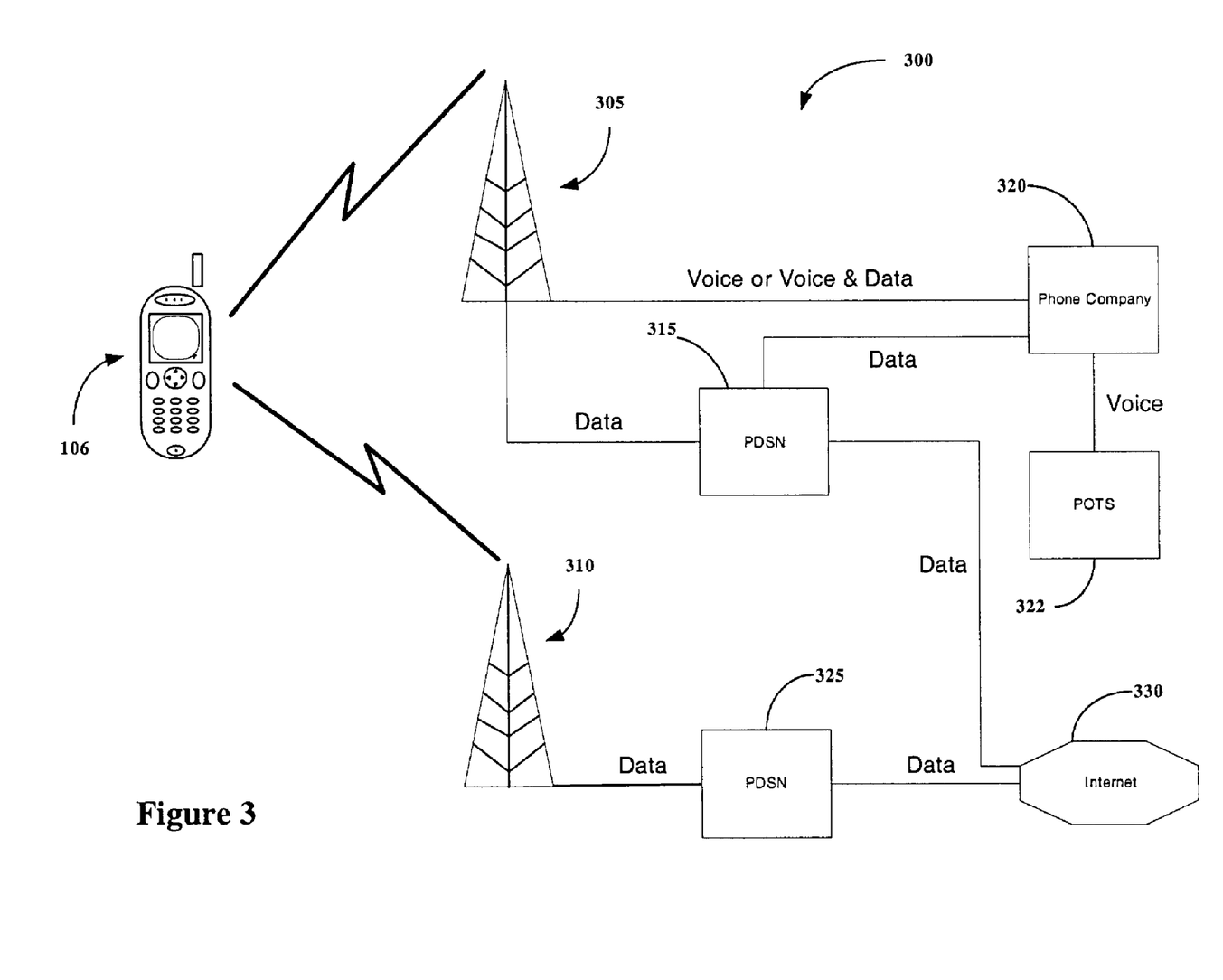
FIG. 3 is an example of a hybrid wireless network capable of voice and data communications.

FIG. 3 is an example of a hybrid wireless network 300 capable of voice and data communications. In the hybrid wireless network 300, the mobile station 106 communicates with a base station 305 connected to a combination voice and data network and a base station 310 connected to a data network. The wireless network can utilize any format for the voice and data communications. For example, CDMA 2000 can be used for the voice communications and 1×ev, otherwise known as High Data Rate (HDR) can be used for data communications. The base station 305 connected to a voice network is linked to a packet data serving node (PDSN) 315 for data communications and is also linked to the phone company 320 for voice or voice and data communications. The PDSN 315 is connected to both the phone company 320 and the Internet 330. The phone company 320 may be connected to a Plain Old Telephone System (POTS) 322 for voice communication. The base station 310 connected to the data network is linked to a PDSN 325, which in turn in connected to the Internet 330. Monitoring both the voice and data systems causes the mobile station to use approximately twice the amount of power than monitoring only a single system. This increased power usage significantly reduces the battery life.

To save power, there are many times when it is not necessary to monitor one of the two systems, so that system is handed over to the other system. For purposes of illustration, the system that is handed over will be assumed to be the second system, or the data system. Of course, it may by any system that is handed over. Although it is not necessary to monitor the second system, it is desirable to ensure fast access. By receiving pilot signals but only demodulating the pilot signals after handoff, "instant on" access may be provided for the second system. Utilizing "Sleep Until Handoff" can therefore be used to continue monitoring the second system and still have "instant on" access, but also significantly reducing power consumption.

Overhead information changes infrequently, and does not need to be received more than once from any pilot. If no handoff is required, the mobile station may return to sleep. If a handoff is required, the CCC may be monitored to obtain overhead information (such as a neighbor list) for the new pilot. When the data session is transferred to the voice session, the mobile station does not need to monitor the CCC for pages, as none will be coming. Thus, the mobile station may return to sleep mode (low power consumption) faster, resulting in a shorter awake (high power consumption) time. Because the mobile station still monitors the neighbor pilot strengths, and will handoff from pilot to pilot as the mobile station moves through the network, the system is immediately available when needed, and gives the appearance of always on.

Using "Sleep Until Handoff," the mobile station is in the sleep mode until just prior to a designated slot. Upon wakeup, the mobile station ensures a link is maintained with the network by measuring the strength of several pilots. If a neighbor pilot is stronger than the current pilot, a handoff is performed. After handoff, the Control Channel Capsule (CCC) may be demodulated by the mobile station to obtain new overhead information, such as neighbor pilots. If no handoff is performed, the reacquisition slew for the current pilot is measured and fed back to the sleep controller to determine the next wake-up time. The mobile station then returns to sleep mode.

If the mobile station is not moving and is approximately equal distance between a plurality of base stations, it is possible that the mobile station may try to continually handoff between the base stations. To save power, the mobile station may cache overhead information and obtain the necessary handoff information from the cache rather that demodulating the pilot signal.

Figure 4:
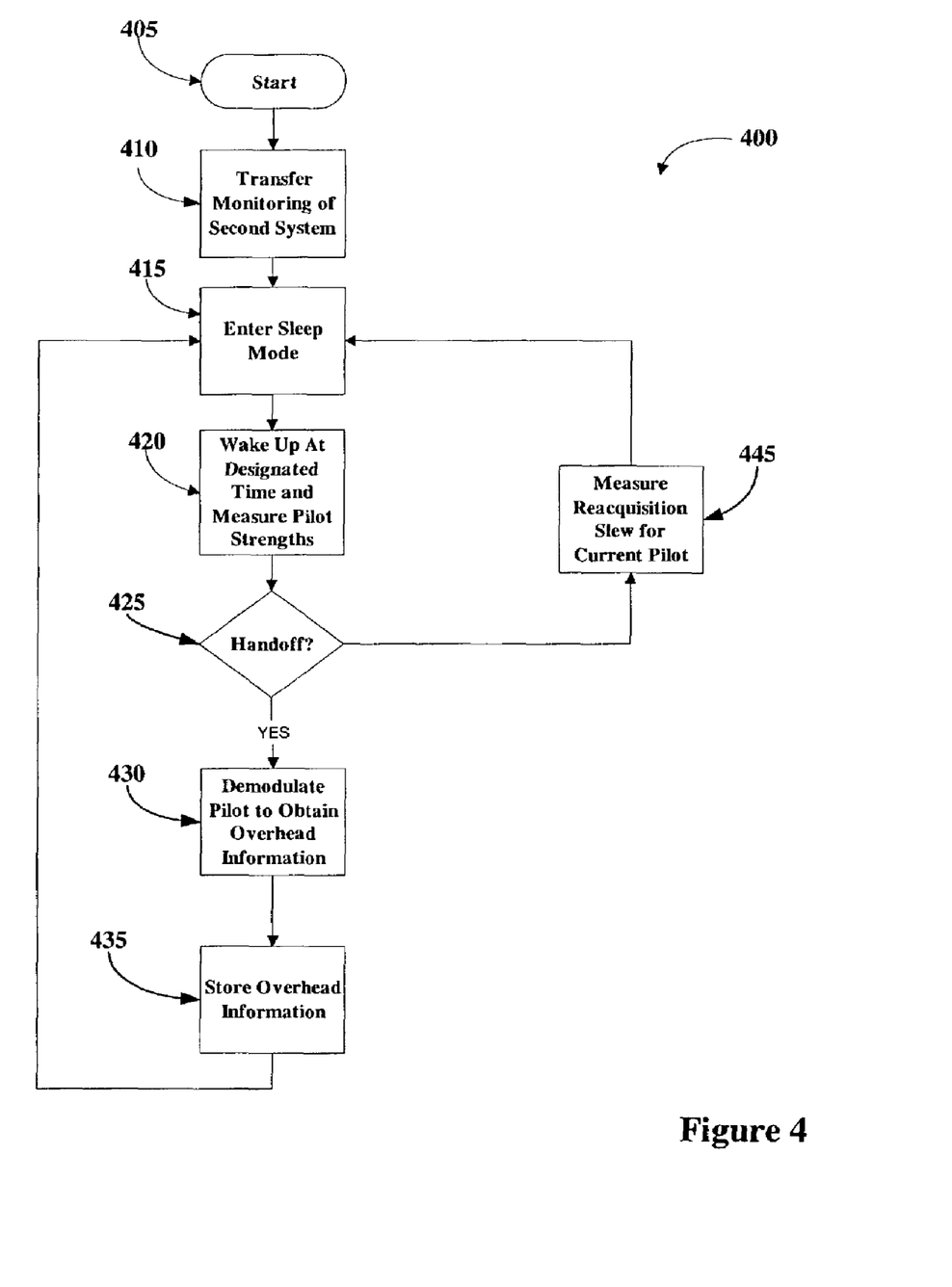
FIG. 4 illustrates the process 400 of utilizing the sleep until handoff of the mobile station 106.

FIG. 4 illustrates the process 400 of utilizing the sleep until handoff of the mobile station 106. The process 400 begins in a START state 405. Proceeding to block 410, the mobile station 106 transfers the monitoring of the second system to the first system. By transferring the monitoring of the second system, the mobile station 106 does not need to monitor the CCC for pages, as none will be coming. Because only one system is now monitored, the mobile station 106 may enter the sleep mode more quickly.

Proceeding to block 415, the mobile station 106 enters the sleep mode. In the sleep mode, most operations of the mobile station are shut off, thereby reducing power consumption. The longer the mobile station 106 remains in the sleep mode, the battery life of the mobile station 106 increases. Thus, it is desirable to have the mobile station 106 remain in the sleep mode as much as possible.

Proceeding to block 420, the mobile station 106 wakes up at a designated time and measures the strengths of the pilot signals. The reacquisition slew determines when the mobile station wakes up to process the pilot signals at a designated slot. The mobile station 106 wakes up prior to a designated slot and checks the pilot signals. The relative strengths of the pilot signals may be measured to determine if a handoff is needed.

Proceeding to block 425, the mobile station 106 determines if a handoff is needed. Typically, if a neighboring pilot signal is stronger than the current pilot signal, a handoff to that neighbor would be desirable. Thus, the processor of the mobile station 106 compares the relative strength of the measured pilot signals, and if a signal other that the current pilot signal has the highest power, a handoff is warranted and the process 400 proceeds along the YES branch to block 430. In block 430, the pilot signal is demodulated to obtain overhead information such as the channel list and a new list of neighbors. The signal is only demodulated following a handoff, thereby allowing the mobile station 106 to enter the sleep mode faster if no handoff is necessary.

Proceeding to block 435, the overhead information is stored in the memory of the mobile station 106. This information may be used if the mobile station 106 is stationary and is approximately equal distance between two base stations. The mobile station may cache this overhead information in memory and obtain the necessary information for the handoff from the cache memory rather than demodulating the pilot signal. After storing the overhead information, the process 400 returns to block 415 where the mobile station 106 reenters the sleep mode.

Returning to block 425, if the current pilot signal remains the strongest, no handoff is necessary and the process 400 proceeds along the NO branch to block 445. In block 445, the reacquisition slew is measured for the current pilot signal. The reacquisition slew is used to inform the mobile station 106 when it next needs to check the pilot signals. After determining when it next needs to wake up, the mobile station 106 returns to the sleep mode in block 415.

Figure 5:
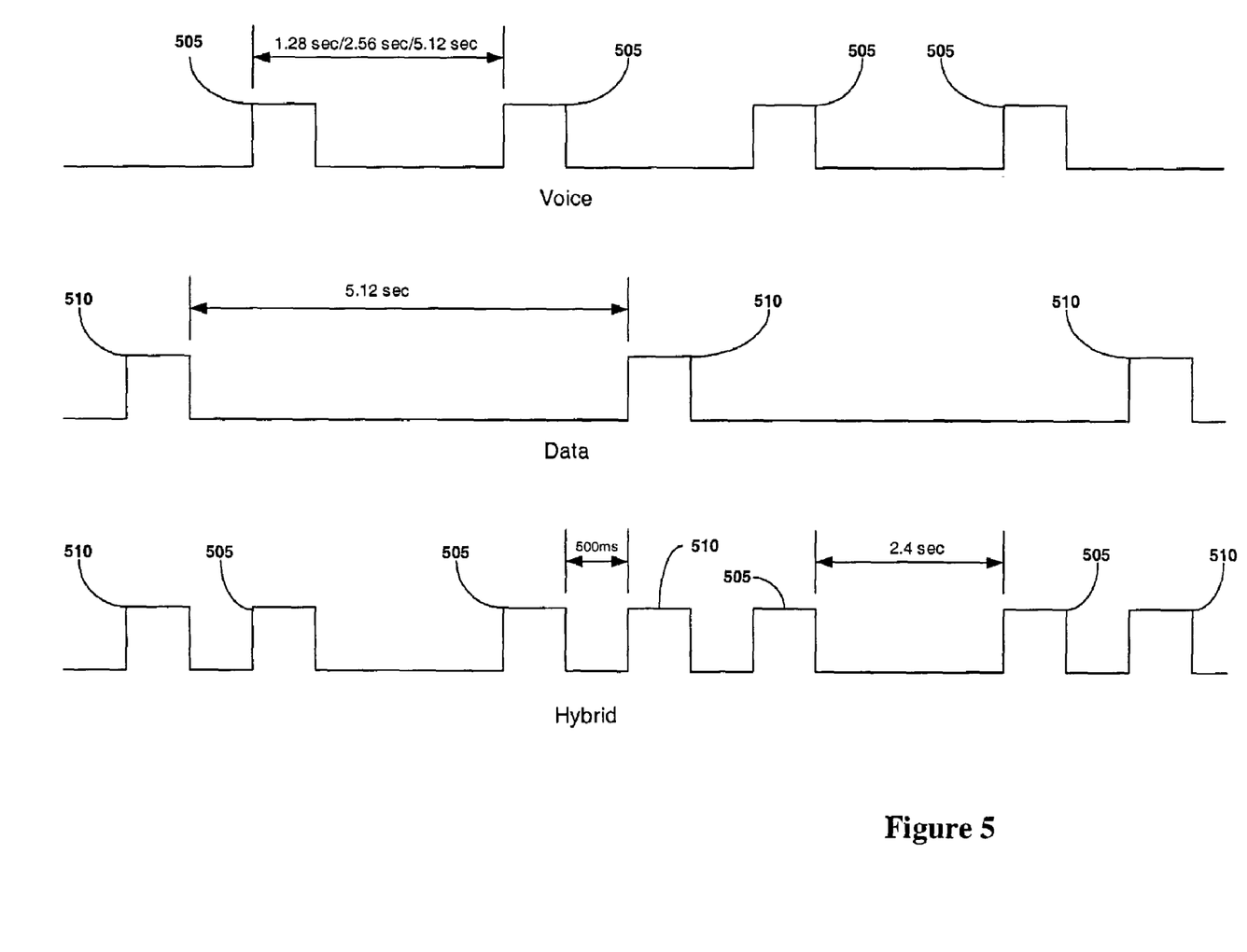
FIG. 5 is a timing diagram showing the timing of the voice session, the data session, and a hybrid of the two.

FIG. 5 is a timing diagram showing the timing of the voice session, the data session, and a hybrid of the two. In the voice session, the mobile station 106 is activated periodically for a predetermined period of time as indicated at 505. In the data session, the mobile station 106 is also activated periodically for a predetermined period of time as indicated at 510. When the mobile station 106 monitors both systems, the mobile station 106 activates during each of the predetermined time periods 505, 510, resulting in the mobile station being active quite frequently.

Figure 6:
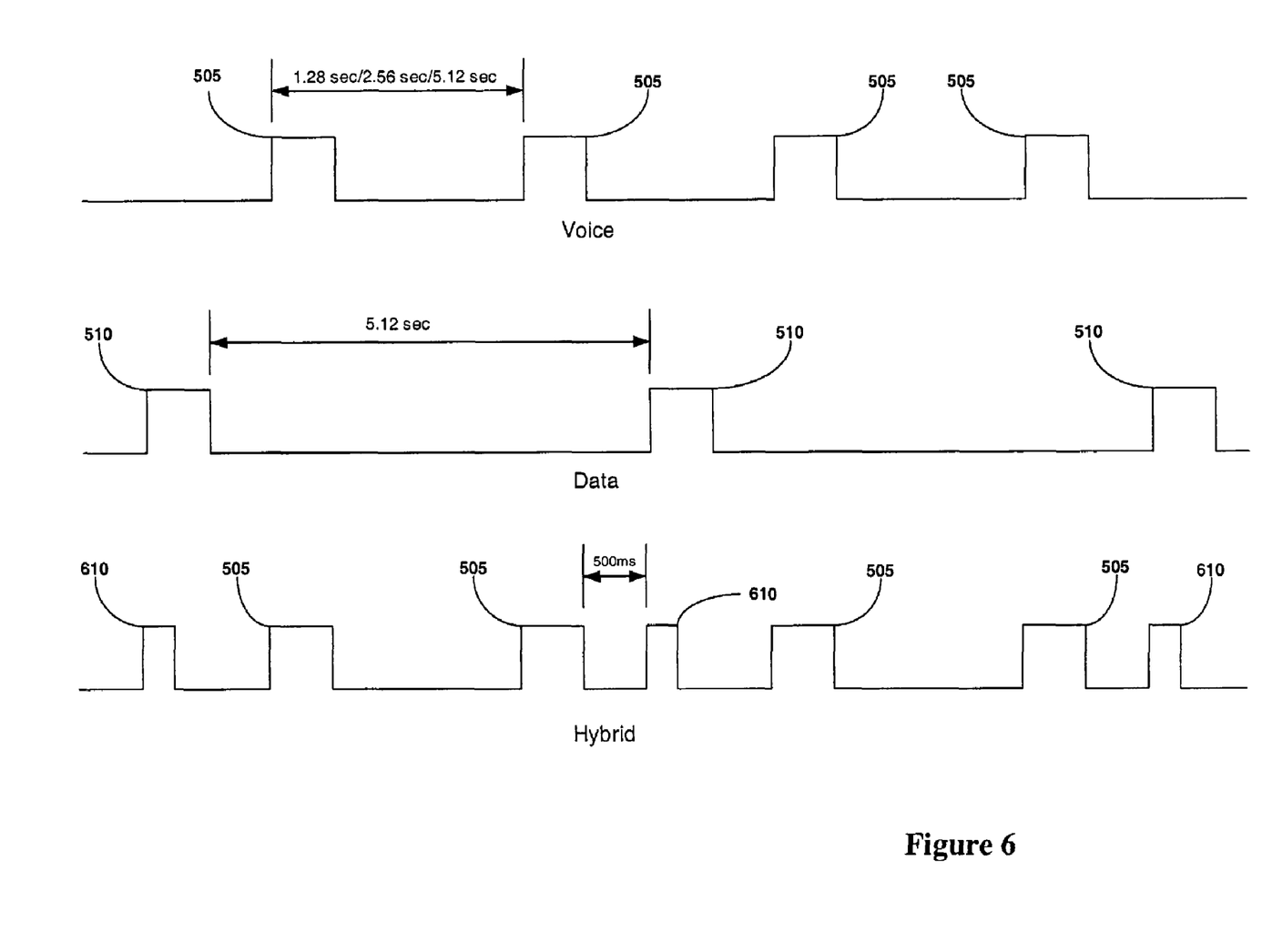
FIG. 6 is a timing diagram showing the timing of the voice session, the data session, and a hybrid of the two using the disclosed method.

FIG. 6 is a timing diagram showing the timing of the voice session, the data session, and a hybrid of the two using the disclosed method. In the hybrid session, the receiver of the mobile station 106 is turned off prior to the slot when monitoring the data session. Thus, the period of time 610 the mobile station 106 monitors the data session is significantly shorter than the period of time 510. This allows the mobile station to reenter the sleep mode sooner, thereby consuming less power.

Although the present device has been fully described in connection with the preferred embodiments thereof with reference to the accompanying drawings, it is to be noted that various changes and modifications will become apparent to those skilled in the art. Such changes and modifications are to be understood as being included within the scope of the present device as defined by the appended claims.

What is claimed is:

1. A mobile station comprising:
a receiver for receiving a first plurality of signals from a first base station operating in a voice network and a second plurality of signals from a second base station operating in a data network; and
a processor which controls the receiver and analyzes the second plurality of signals, the processor configured to activate the receiver prior to a paging slot and determine if a handoff in the data network is desired, wherein the processor deactivates the receiver prior to the paging slot if no handoff is desired.

2. The mobile station of claim 1, wherein the processor stores the second plurality of signals in memory.

3. The mobile station of claim 1, wherein the second plurality of signals includes pilot signals.

4. The mobile station of claim 3, wherein the processor determines if a handoff is desired by comparing the relative strengths of the pilot signals.

5. The mobile station of claim 1, wherein the processor demodulates one or wore of the second plurality of signals when a handoff is desired.

6. The mobile station of claim 5, wherein the processor stores the demodulated signal information in memory.

7. The mobile station of claim 6, wherein the processor retrieves the demodulated signal information in memory for repeated handoffs between the signal areas.

8. The mobile station of claim 1, wherein the processor determines when to activate the receiver based on a predetermined amount of time.

9. A method of fast reacquisition comprising:
receiving a first plurality of signals from a first base station operating in a voice network and a second plurality of signals from a second base station operating a data network;
activating a receiver prior to a paging slot:
analyzing the second plurality of signals to determine if a handoff in the data network is desired; and
deactivating the receiver prior to the paging slot if no handoff is desired.

10. The method of claim 9, further comprising demodulating one or more of the plurality of signals if a handoff is desired.

11. The method of claim 10, further comprising storing demodulated signal information.

12. The method of claim 11, further comprising retrieving the demodulated signal information from memory for repeated handoffs between signal areas.

13. The method of claim 11, further comprising comparing the relative strengths of the plurality of signals to determine if a handoff is desired.

14. A wireless communication system comprising:
a plurality of base stations, each of the plurality of base stations transmitting a pilot signal; and
a mobile station comprising: a receiver for receiving a first plurality of pilot signals from a first one of the plurality of base stations operating a voice network and a second plurality of pilot signals from a second one of the plurality of base stations operating data network; and
a processor which controls the receiver and analyzes the second plurality of pilot signals, the processor configured to activate the receiver prior to a paging slot and determine if a handoff to one of the plurality of base stations operating in the data network is desired, wherein the processor deactivates prior to the paging slot if no handoff is desired.

15. The wireless communication system of claim 14, wherein the mobile station demodulates the pilot signals to obtain overhead information if a handoff is desired.

16. The wireless communication system of claim 15, wherein the mobile station stores the overhead information in memory.

17. The wireless communication system of claim 15, wherein the mobile station performs a handoff based on the overhead information.

18. The wireless communication system of claim 16, wherein the mobile station uses the overhead information in memory for repeated handoff between two or more of the plurality of base stations.

19. The wireless communication system of claim 14, wherein the mobile station determines if a handoff is desired by comparing relative strengths of the plurality of pilot signals.

20. A mobile station comprising:
means for receiving a first plurality of signals from a first base station operating in a voice network and a second plurality of signals from a data network;
means for activating said means for receiving prior to a paging slot;
means for analyzing the second plurality of signals to determine if a handoff in the data network is desired; and
means for deactivating said means for receiving prior to the paging slot if no handoff is desired.

21. The mobile station of claim 20, timber comprising means for demodulating one or more of the plurality of signals if.

22. The mobile station of claim 21, further comprising means for storing demodulated signal information.

23. The mobile station of claim 22, further comprising means for retrieving the demodulated signal information from memory for repeated handoffs between signal areas.

24. The mobile station of claim 20, timber comprising means for comparing the relative strengths of the second plurality of signals to determine if a handoff is desired.

* * * * *